T. KOLLNER.
ANIMAL RELEASING DEVICE.
APPLICATION FILED MAY 13, 1914.

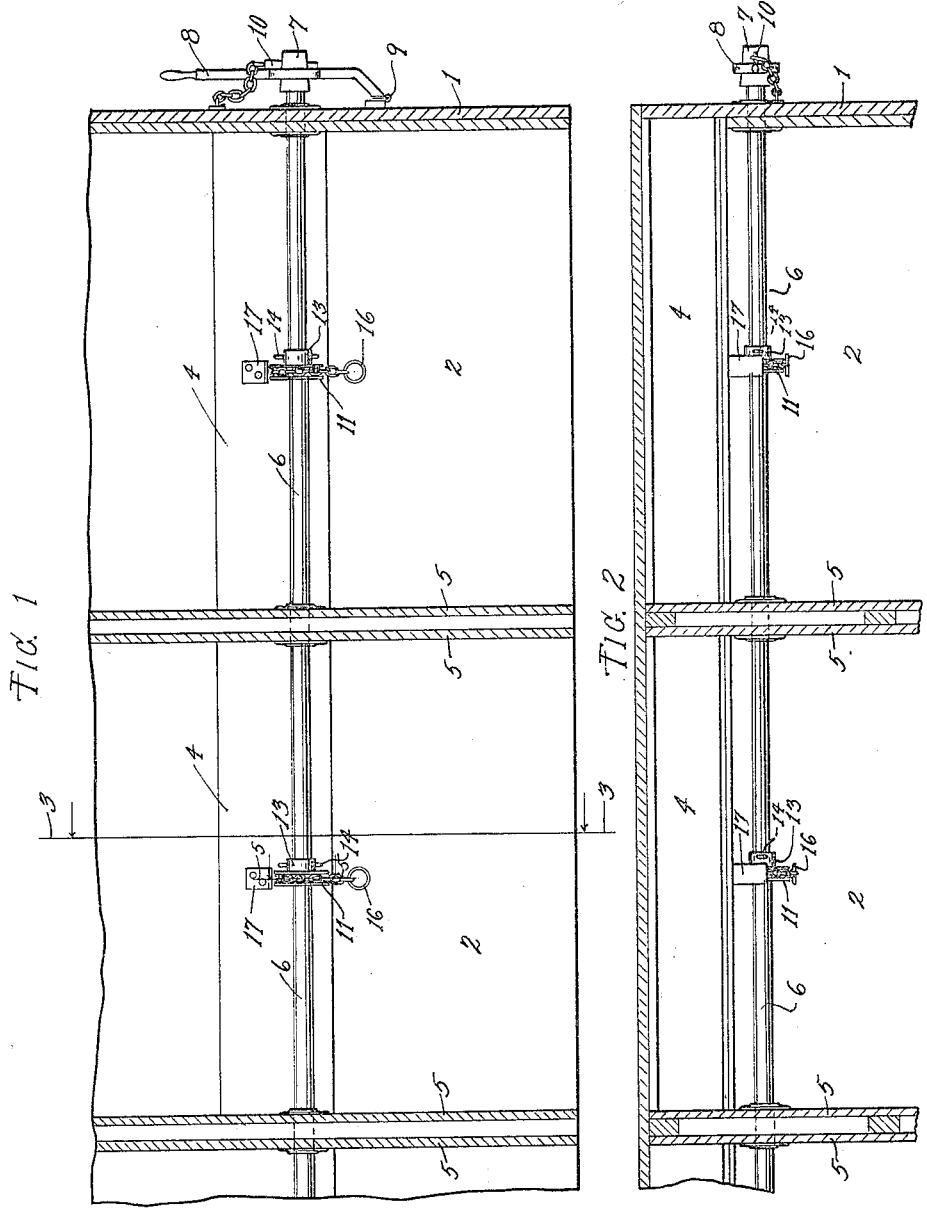

1,139,539.

Patented May 18, 1915.
2 SHEETS—SHEET 2.

WITNESSES
Otto Melchior
A. S. S. Nickelsen

INVENTOR
T. Kollner
H. Danders
BY
ATTY.

UNITED STATES PATENT OFFICE.

THOMAS KOLLNER, OF OWENDALE, MICHIGAN.

ANIMAL-RELEASING DEVICE.

1,139,539.  Specification of Letters Patent.  Patented May 18, 1915.

Application filed May 13, 1914. Serial No. 838,238.

*To all whom it may concern:*

Be it known that I, THOMAS KOLLNER, a citizen of Hungary, residing at Owendale, in the county of Huron and State of Michigan, have invented certain new and useful Improvements in Animal-Releasing Devices, of which the following is a specification.

This invention relates to improvements in animal releasing devices and its object is to produce a device of this class whereby horses or other animals haltered and confined in open stalls may be instantly released in case of emergency without going into the stalls or into the stable in which such stalls are arranged.

With the foregoing and other objects in view the invention consists in the combination and arrangement of parts to be hereinafter fully described in the following specification, pointed out in the claims and illustrated in the accompanying drawings which form a part of said specification and in which—

Figure 3:
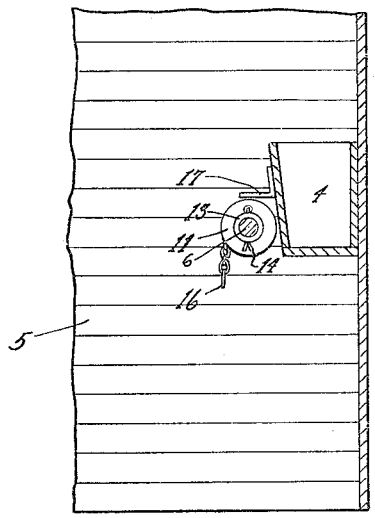
Figure 4:
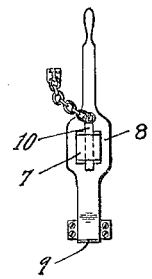
Figure 5:
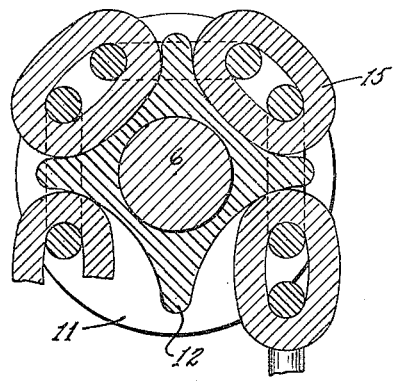

Figure 1 is a front elevation of my improved device in position in a series of stalls. Fig. 2 is a plan of the same. Fig. 3 is a section taken on line 3—3 of Fig. 1. Fig. 4 is a detail of the lever employed. Fig. 5 is a section taken on line 5—5 of Fig. 1.

Like reference characters indicate corresponding parts throughout the several views.

In the drawings the reference numeral 1 indicates the outside wall of a building which is built with a plurality of stalls 2. Within each stall is a trough 4. Through the stall walls 5 and through the outside wall 1 of the building a rod 6 is projected, which is formed square in cross section as at 7 at one extremity and said extremity is disposed in engagement with a stop lever 8 which is hinged as at 9 to the wall 1 and said lever normally is retained against movement upon its hinge by a keeper 10, projected through the rod end 7 and said keeper 10 is chain connected to the wall 1.

Within each stall a wheel comprising disks 11, 11 and teeth 12 is disposed upon shaft 6 and said wheel is formed with a hub 13 provided with a pin 14 extending therethrough and through said shaft whereby said hub and wheel are locked in engagement with said shaft. A hitching chain 15, provided with a terminal hitching ring 16, engages the teeth 12 of the wheel and immediately above said wheel a chain guard 17 is disposed and secured to the trough to prevent the accidental disengagement of the chain 15 from the wheel. The animal in the stall is, of course, hitched to the ring 16 from which he may readily be disengaged in the usual manner under ordinary circumstances.

In case of fire or other emergency the several animals in the several stalls are released in the following manner: By withdrawing the keeper 10 from the rod termination 7 the lever 8 may be moved out of engagement with the rod which will permit rotation of the rod 6 in response to the efforts of one or more of the animals in the stalls to free himself and rotation of the said rod will cause the several chains 15 to move out of engagement with the teeth 12 of the wheels permitting the escape of the animals.

What is claimed is:—

1. The combination with a series of stalls in a row and a trough within said stalls, of a rotary shaft extending across the inner ends of said stalls adjacent said trough, manually releasable locking means terminally carried by said shaft, toothed wheels within said stalls made fast to said shaft and chains, provided with hitching rings, in engagement with the teeth of said wheels.

2. The combination with a series of stalls in a row and a trough within said stalls, of a rotary shaft extending across the inner ends of said stalls adjacent said trough, manually releasable locking means for said shaft, toothed wheels within said stalls made fast to said shaft, chains provided with hitching rings in engagement with the teeth of said wheels and chain guards secured to said trough and disposed immediately above said toothed wheels.

In testimony that I claim the foregoing as my own I have hereto affixed my signature in the presence of two subscribing witnesses.

THOMAS KOLLNER.

Witnesses:
W. J. DUFTY,
ROLAND SOLDAN.

Copies of this patent may be obtained for five cents each, by addressing the "Commissioner of Patents, Washington, D. C."